United States Patent [19]

Kasher

[11] Patent Number: 5,174,527
[45] Date of Patent: Dec. 29, 1992

[54] ANNULAR SPINNING PARACHUTE

[75] Inventor: Anthony D. Kasher, Minneapolis, Minn.

[73] Assignee: Alliant Techsystems Inc., Edina, Minn.

[21] Appl. No.: 580,244

[22] Filed: Sep. 10, 1990

[51] Int. Cl.⁵ .................... B64D 17/02; B64D 17/18
[52] U.S. Cl. ............................ 244/145; 244/138 R; 244/142
[58] Field of Search ................. 244/145, 142, 138 R

[56] References Cited

U.S. PATENT DOCUMENTS

| | | | |
|---|---|---|---|
| 1,777,441 | 10/1930 | Malmer | 244/145 |
| 1,931,160 | 10/1933 | Knight | 244/145 |
| 2,511,263 | 6/1950 | Hiscock | 244/145 |
| 2,764,375 | 9/1956 | Lemoigne | 244/145 |
| 2,949,266 | 8/1960 | Sepp, Jr. | 244/145 |
| 3,055,621 | 9/1962 | Martin | 244/142 |
| 3,127,137 | 3/1964 | Downing | 244/145 |
| 3,136,508 | 6/1964 | Sepp, Jr. | 244/145 |
| 3,218,007 | 11/1965 | Gross | 244/145 |
| 3,298,640 | 1/1967 | Heinrich | 244/145 |
| 3,840,202 | 10/1974 | Lemoigne | 244/145 |
| 4,834,323 | 5/1989 | Reuter | 244/145 |

FOREIGN PATENT DOCUMENTS

| | | | |
|---|---|---|---|
| 538595 | 7/1959 | Belgium | 244/145 |
| 818873 | 6/1937 | France | 244/145 |
| 281881 | 12/1927 | United Kingdom | 244/145 |
| 2058691 | 4/1981 | United Kingdom | 244/145 |

OTHER PUBLICATIONS

Rotating Round Parachute, 1 sheet.
Rotating Cross Parachute, 1 sheet.
Vortex Ring Parachute, 1 sheet.
Sandia National Laboratories technical paper "New, High Performance Rotating Parachute".

*Primary Examiner*—Joseph F. Peters, Jr.
*Assistant Examiner*—Anne E. Bidwell
*Attorney, Agent, or Firm*—Merchant, Gould, Smith, Edell, Welter & Schmidt

[57] ABSTRACT

An annular spinning parachute is composed of an annular canopy symmetrical about an apex, suspension lines of substantially the same length and interconnected together at the canopy apex and extending radially outwardly therefrom across the canopy and downwardly therefrom for coupling to an object supported by the parachute, and centerlines interconnected with the suspension lines at the canopy apex and extending downwardly therefrom for coupling to the object supported by the parachute. The annular canopy includes fabric panels each having a generally trapezoidal shape defined by a pair of opposing inner and outer borders with the outer border being greater length than the inner border and a pair of opposing side borders of substantially the same length. The annular canopy also includes inner and outer lateral bands respectively extending along and connected to the inner and outer borders of the fabric panels so as to dispose the panels in circumferentially spaced relation with respect to one another upon inflation of the canopy. The inner and outer bands and spaced panels define a central opening in the canopy having thhe canopy apex at the center of the opening and a plurality of exhaust vents arranged in alternating relation with the panels between the side borders of adjacent pairs of the panels.

23 Claims, 3 Drawing Sheets

ANNULAR SPINNING PARACHUTE

BACKGROUND OF THE INVENTION

1. Field of the Invention

The present invention generally relates to spinning parachutes and, more particularly, is concerned with an annular rotating flexible decelerator type spinning parachute for decelerating and transmitting torque to a scanning submunition enabling it to search a spiral path in a target area.

2. Description of the Prior Art

A wide area mine (WAM) submunition is currently being developed for the U.S. military. The WAM (also termed a "smart" mine) submunition emplaced on the ground has a noise sensor that can detect the sounds, or acoustic signature, of a heavy vehicle, such as a tank, in a target area around its periphery.

When a tank is detected in the target area, the WAM submunition launches a sublet from its launcher tube on a ballistic trajectory over the target area. Then, a spinning parachute is deployed which slows the sublet and places it in an inward spiraling descent over the target area with a scanner in the sublet scanning the area beneath the descending sublet until the target is located. Once the sublet has a fix on the target, a warhead detonates, sending an explosively-formed projectile into the target at a high velocity to achieve destruction of the target.

As shown in FIG. 1, a spinning type parachute A is typically used for decelerating and transmitting torque to the scanning sublet B for enabling it to search a spiral path C in a target area. The efficiency of this search is improved by decreasing the distance between subsequent scans, called the lacing distance R. For a fixed hang angle, the lacing distance R will decrease when the parachute descends slower and/or spins faster. Thus, the higher the ratio of spin rate p to vertical descent velocity V of the spinning parachute, the more efficient the search pattern.

Existing spinning parachute designs are: (1) a round parachute modified to spin by cutting exhaust vents in the panels from which air can be deflected to induce a spin; (2) a cross or cruciform parachute modified to spin by shortening the suspension line(s) on one edge of each panel to create a pitch angle; (3) a vortex ring parachute which has four panels, each held at a pitch angle by a series of various length suspension lines along its perimeter; and (4) a rotating flexible decelerator parachute being a flat circular round parachute with one edge of each gore attached to one radial line and the opposite edge flying free which when inflated causes the gores to assume a pitch angle, thereby inducing a spin, and provides an exhaust vent along the entire radius.

Spinning parachute designs are judged on the basis of performance, weight, volume and producibility. Parachute performance, in general, is represented by drag, stability and deployability. In addition, spinning parachute performance is represented by spin rate and advance ratio, or the ratio of spin rate to descent velocity. Drag and payload weight determine descent velocity with drag coefficient ($C_d$) based on the fabric area, fabric permeability and parachute type.

Stability refers to degree of oscillation. A spinning sublet requires a stable platform (with minimal oscillation) for aim accuracy. Stability is important because large oscillations can cause unpredictable descent velocities and flight paths. Stability improves as porosity is increased (i.e. more porous fabric and/or larger vent areas); however, increased porosity has the negative effect of decreasing drag.

Deployability or parachute inflation results from a pressure differential between the inside and outside of the folded parachute because of a higher freestream velocity along the outside surface. If parachute solidity (fabric area/disk area) is too low, the freestream velocity through the inside of the folded parachute will be too high to induce a pressure differential sufficient to induce inflation.

As with any flight system, weight of the parachute should be minimized. Low volume is also particularly important for packing efficiency of the parachute. Therefore, it is desirable to choose a spinning parachute design that uses as little material and as simple a structure as possible.

Finally, parachute producibility is dependent upon structural complexity and strength requirements. In most instances, parachutes do not lend themselves well to mass production. The elasticity of parachute materials, particularly that of the fabric which due to the variability related to the weave orientation, can cause problems with deformation during the sewing process, thereby causing problems with dimensioning and tolerancing. Tolerancing errors increase cost and reduce reliability. Structural simplicity contributes to producibility, which relates directly to cost.

A desirable goal is to design a spinning parachute that maximizes drag, spin rate and stability, while minimizing weight and volume for applications such as the WAM sublet noted above. None of the above-mentioned existing spinning parachute designs, except the rotating flexible decelerator parachute satisfy the need for such applications. Consequently, the invention described herein satisfies a need for certain types of payloads that require a rotating decelerator.

SUMMARY OF THE INVENTION

The present invention provides an annular rotating flexible decelerator parachute designed to satisfy the aforementioned needs. The parachute design of the present invention, hereinafter referred to as an "annular spinning parachute", retains the structural simplicity of the prior art rotating flexible decelerator parachute by using panels having straight edges and suspension lines having a single length.

In addition, the annular spinning parachute modifies and improves upon the prior art rotating flexible decelerator parachute primarily by (1) removing the center of the parachute, which is the area most likely affected by a turbulent wake of a non-streamlined forebody, and (2) shortening the panel radial length and giving it substantially rectangular or trapezoidal shape for improved stability. The inner radius of the annular structure of the parachute is made equal to approximately one-half the outer radius. The substantially rectangular or trapezoidal shape of each panel of the annular spinning parachute permits support at four corners for improved stability as opposed to three corners in the case of the generally triangular shape of each panel of the prior art rotating flexible decelerator parachute.

Accordingly, the present invention is directed to an annular spinning parachute which comprises: (a) an annular canopy generally symmetrical about an apex and including a pair of spaced inner and outer lateral bands defining inner and outer peripheries of the annular canopy and a plurality of fabric panels extending between and interconnecting the bands, the inner and outer bands and the panels defining a central opening having the canopy apex at a center thereof, the inner band being spaced radially outwardly from the apex and radially inwardly from the outer band; (b) a plurality of suspension lines of substantially the same length and interconnected together at the apex of the canopy and extending radially outwardly from the apex along and connected to the respective panels and downwardly from the outer band, the suspension lines being attachable to an object for supporting the object by the parachute; and (c) at least one centerline interconnected with the suspension lines at the canopy apex and extending downwardly therefrom, the centerline being attachable to the object for assisting in causing inflation of the canopy upon deployment of the parachute.

More particularly, each fabric panel has a generally trapezoidal shape defined by a pair of opposing inner and outer borders and a pair of opposing side borders extending between the inner and outer borders. The outer border of each panel is of greater length than the inner border thereof. The side borders are of substantially the same length.

Further, the inner and outer lateral bands respectively extend along and are connected to the inner and outer borders of the fabric panels so as to dispose the panels in circumferentially spaced relation with respect to one another upon inflation of the canopy. The inner and outer bands and the spaced panels define a plurality of exhaust vents arranged in alternating relation with the panels between the side borders of adjacent pairs of the panels. The suspension lines are connected to one of the side borders of each of the panels.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Prior Art RFD Spinning Parachute

Figure 1:
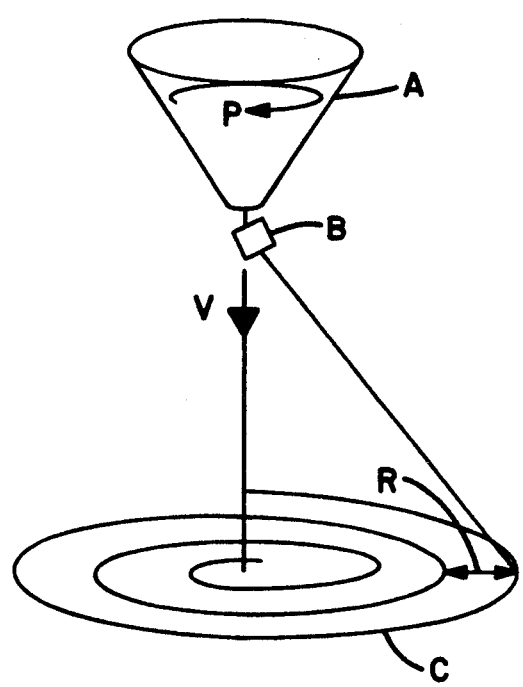
FIG. 1 is a diagrammatic view of a spinning parachute with a scanning payload.
Figure 2:
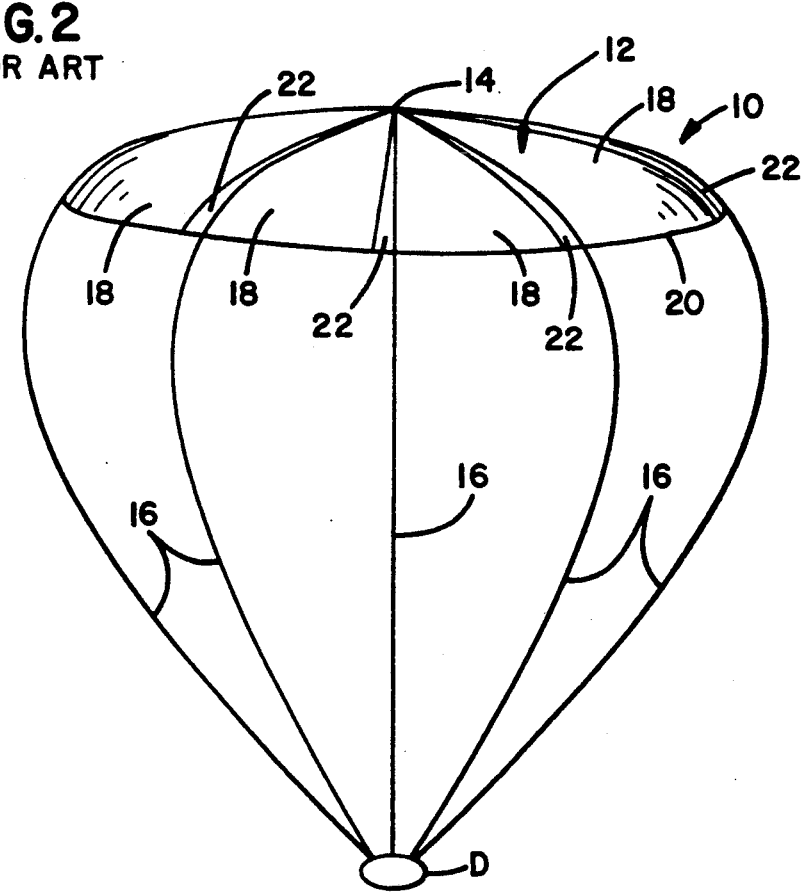
FIG. 2 is a diagrammatic view of a prior art rotating flexible decelerator type spinning parachute.
Figure 3:
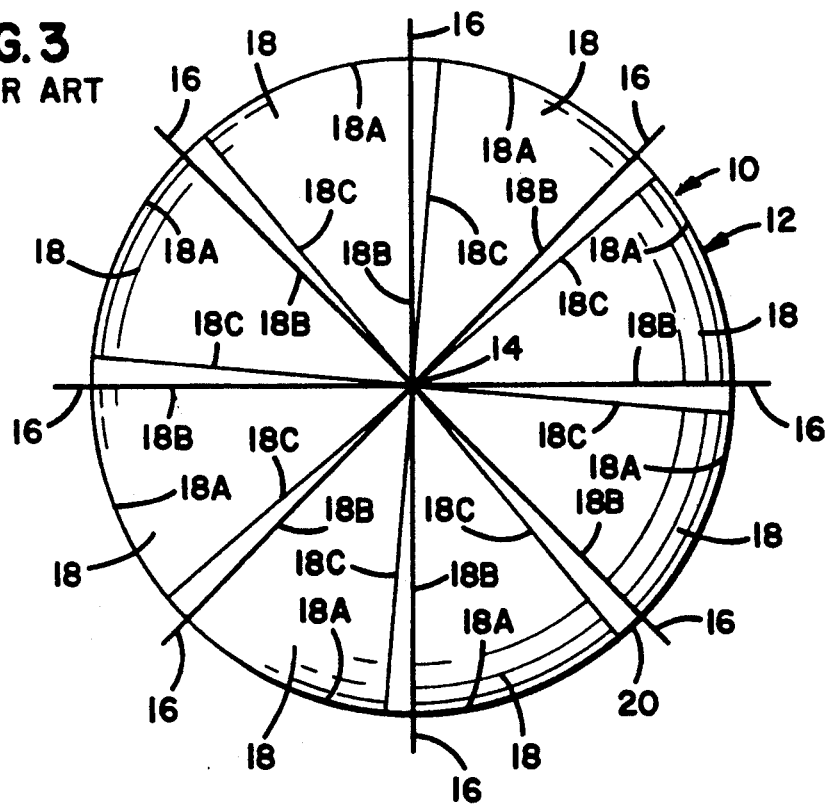
FIG. 3 is a top plan view of the prior art spinning parachute of FIG. 2.

Referring to the drawings, and particularly to FIGS. 2 and 3, there is shown a prior art rotating flexible decelerator (RFD) type spinning parachute, generally designated 10. Basically, the RFD spinning parachute 10 is composed of a canopy 12 symmetrical about an apex 14, and a plurality of suspension lines 16 of substantially the same length which are interconnected together at the canopy apex 14 and extend radially outwardly therefrom across the canopy 12 and downwardly therefrom for coupling to an object D supported by the parachute 10.

More particularly, the canopy 12 includes a plurality of fabric panels 18 each having a generally triangular shape defined by an outer border 18A and a pair of opposing side borders 18B, 18C which converge and merge together at the canopy apex 14. The canopy 12 also includes an outer lateral band 20 extending along and connected to the outer borders 18A of the fabric panels 18 so as to dispose the panels 18, which are connected together at the apex 14, in a circumferential spaced relation with respect to one another upon inflation of the canopy 12, with the space between the panels 18 becoming progressively larger approaching nearer to the outer lateral band 20 of the canopy 12. The spaces between the panels 18 thus define a plurality of generally triangular shaped exhaust vents 22 arranged in alternating relation with the panels 18 between the side borders 18B, 18C of adjacent pairs of the panels 18.

Pairs of the suspension lines 16 located 180° apart are actually a single continuous line looped over the canopy 12. As represented in FIG. 2, the suspension lines 16 of the parachute 10 tend to bow outwardly due to centrifugal forces to assume an eggbeater shape which has a tendency to flatten the surface area of the canopy 12, maximizing its drag efficiency.

Annular Spinning Parachute of Present Invention

Figure 5:
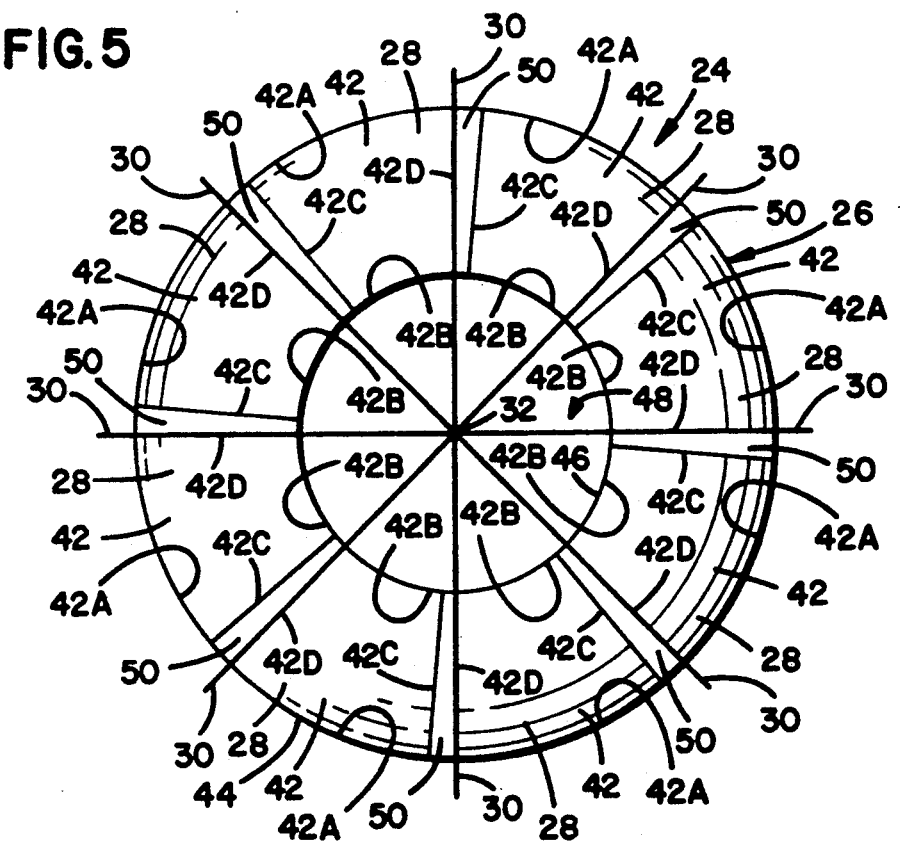
FIG. 5 is a top plan view, on a reduced scale, of the annular spinning parachute of FIG. 4.
Figure 4:
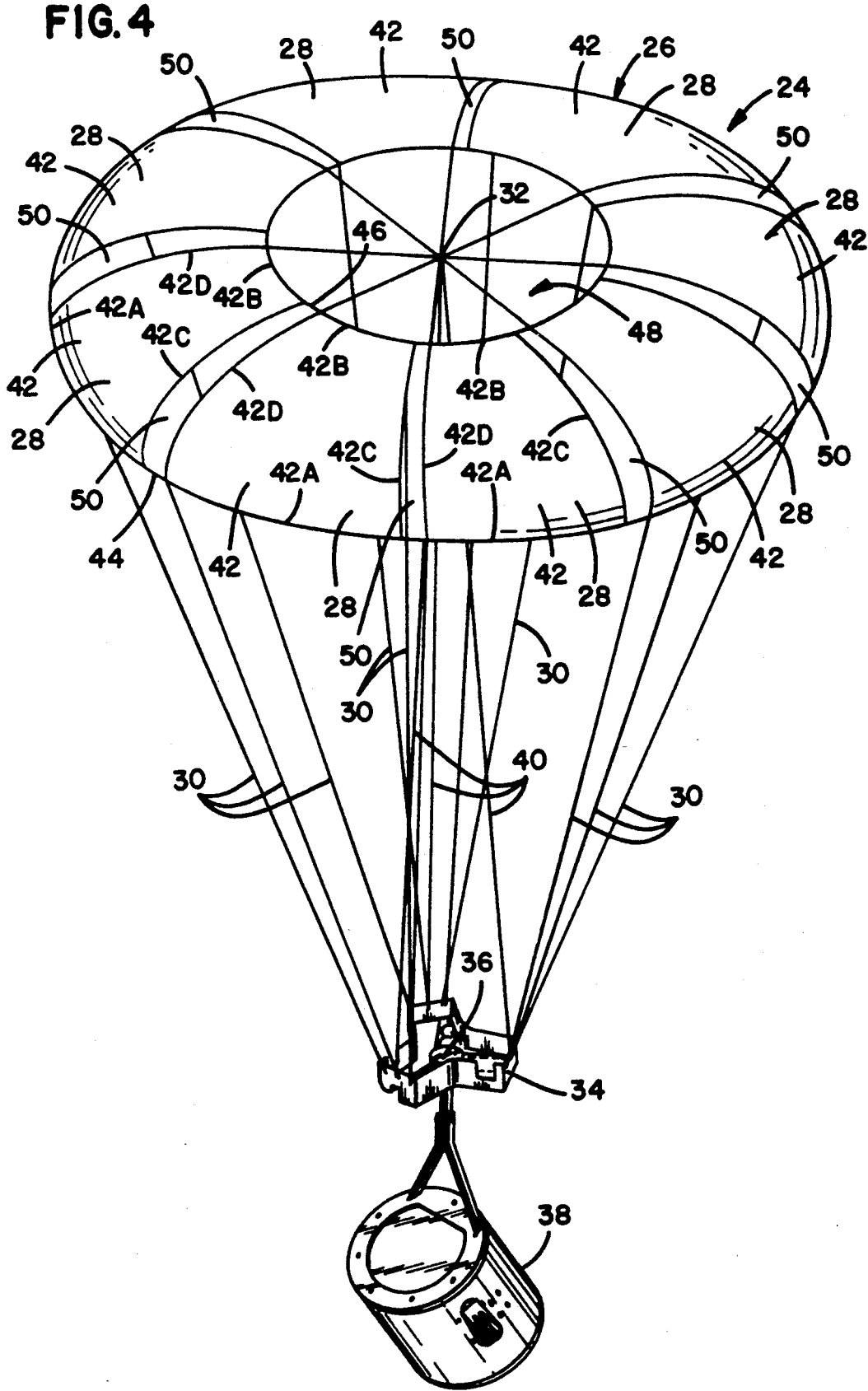
FIG. 4 is a perspective view of an annular spinning parachute of the present invention.

Referring to FIGS. 4 and 5, there is shown an annular spinning parachute 24 of the present invention. The annular spinning parachute 24 retains some of the structural simplicity of the prior art RFD spinning parachute 10 of FIGS. 2 and 3 by using a canopy 26 made up of panels 28 having straight sides and a plurality of suspension lines 30 having a single length. The annular spinning parachute 24 is different from and an improvement over the construction of the prior art parachute 10, as will become clear below.

The canopy 26 of the annular spinning parachute 24 is of an annular shape symmetrical about an apex 32. The suspension lines 30 are of substantially the same length and are interconnected together at the canopy apex 32 and extend radially outwardly therefrom across the annular canopy 26 and downwardly therefrom for coupling to an object supported by the parachute 24. The object shown in FIG. 4 is a spreader plate 34 connected to the suspension lines 30 and a friction slip clutch 36 supported by the spreader plate 34 and mounting a scanning sublet 38.

The annular spinning parachute 24 also includes a plurality of centerlines 40 being interconnected with the suspension lines 30 at the canopy apex 32 and extending downwardly therefrom to where they are attached to the spreader plate 34 also. The centerlines 40 assist in inflation of the annular canopy 26 during deployment of the parachute 24.

More particularly, the annular canopy 26 includes a plurality of fabric panels 42. Each panel 42 has a generally trapezoidal shape defined by a pair of opposing outer and inner borders 42A, 42B and a pair of opposing side borders 42C, 42D. The outer border 42A, is of greater length than the inner border 42B. The opposing side borders 42C, 42D are of substantially the same length.

The annular canopy 26 also includes outer and inner flexible continuous bands 44, 46 respectively extending along and connected to the outer and inner borders 42A, 42B of the fabric panels 42 so as to dispose the panels 42 in circumferentially spaced relation with respect to one another upon inflation of the canopy 24. The outer and inner bands 44, 46 and spaced panels 42 define a central circular opening 48 in the annular canopy 26 having the canopy apex 32 at the center thereof and a plurality of exhaust vents 50, also of generally trapezoidal shape, arranged in alternating relation with the panels 42 between the side borders 42C, 42D of the adjacent pairs of the panels 42. The suspension lines 30 extend along and are connected to one of the side borders 42C, 42D of each panel 42.

The annular spinning parachute 24 thus is different from and an improvement over the prior art RFD parachute 10 primarily by (1) removing the center of the parachute, which is the area most likely affected by a turbulent wake of a non-streamlined forebody, and (2) shortening the panel radial length and giving it substantially rectangular or trapezoidal shape rather than a triangular shape for improved stability. The inner radius of the annular canopy 26 of the parachute 24 is made equal to approximately one-half the outer radius in one embodiment. Also, research has shown the range that the invention is useful when the inner diameter is in the range of two-tenths to six-tenths of the outer diameter. The spin rate and advance ratio increase with increasing ratio of the inner to the outer diameter. Advantageously, the trapezoidal panels 26 can be supported at four corners as opposed to three corners for the triangular panels 18 of the prior art parachute 10. Aeroelastic deformations are also decreased by these modifications, giving better control of flow deflection. The annular spinning parachute 24 has higher drag and rotor coefficients than the prior art RFD spinning parachute 10 for similar diameters. For the annular spinning parachute 24, maximum spin rates occur when the exhaust vent width is one-third the total width of the panel (i.e. 10° vents for a twelve-panel parachute and 15° vents for an eight-panel version), however, the annular spinning parachute is useful when the exhaust vent width ranges from ten percent to forty-five percent of the total panel width. Higher or lower values can result in unstable oscillations of the parachute. The ratio of the exhaust vent width to the total panel width ca be adjusted to "tune" the parachute to a particular spin rate. The performance of the annular spinning parachute can also be enhanced by adding weight(s) to the outer periphery of the canopy or the outer later band, i.e., at the outer later band at the suspension line attachment points. The reaction forces of the weight(s) when spinning cause the canopy to flatten, thereby presenting the canopy at more of a right angle to the freestream. Also, the annular spinning parachute can be used with nonspinning payloads by simply decoupling the payload from the spinning parachute as by use of a swivel coupling.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An annular spinning parachute, comprising:
   (a) an annular canopy generally symmetrical about an apex and including a pair of spaced inner and outer lateral bands defining inner and outer peripheries of said annular canopy and a plurality of fabric panels extending between and interconnecting said bands and having a generally trapezoidal shape defined by a pair of opposing inner and outer borders and a pair of opposing side borders extending between said inner and outer borders and wherein said inner and outer bands and said spaced panels define a plurality of exhaust vents having a generally trapezoidal shape arranged in alternating relation with said panels between said side borders of adjacent pairs of said panels, said inner and outer bands and said panels defining a central opening having said canopy apex at a center thereof, said inner band being spaced radially outwardly from said apex and radially inwardly from said outer band;
   (b) a plurality of suspension lines interconnected together at said apex of said canopy and extending radially outwardly from said apex along and connected to said respective panels and downwardly from said outer band, said suspension lines being attachable to an object for supporting the object by said parachute; and
   (c) at least one centerline interconnected with said suspension lines at said apex of said canopy and extending downwardly therefrom, said centerline being attachable to the object for assisting in causing inflation of said canopy upon deployment of said parachute.

2. The parachute of claim 1 wherein said suspension lines have substantially the same length.

3. The parachute of claim 1 wherein said outer border of each panel being of greater length than said inner border thereof.

4. The parachute of claim 1 wherein said side borders are of substantially the same length.

5. The parachute of claim 1 wherein said inner and outer lateral bands respectively extend along and are connected to said inner and outer borders of said fabric panels so as to dispose said panels in circumferentially spaced relation with respect to one another upon inflation of said canopy.

6. The parachute of claim 1 wherein said suspension lines extend along and are connected to one of said side borders of each of said panels.

7. The parachute of claim 1 wherein said each exhaust vent has a width which is approximately one-third the total width of each said panel.

8. The parachute of claim 1 wherein said inner band has an inner radius being equal to approximately one-half an outer radius of said outer band.

9. The parachute of claim 1, wherein the width of the exhaust vents ranges from 10% to 45% of the total panel width.

10. The parachute of claim 9, wherein said inner band has an inner radius being equal to approximately one half an outer radius of said outer band.

11. An annular spinning parachute, comprising:
    (a) an annular canopy generally symmetrical about an apex and including a pair of spaced inner and outer lateral bands defining inner and outer peripheries of said annular canopy and a plurality of fabric panels extending between and interconnecting said bands, said inner band being spaced radially outwardly from said apex and radially inward from said outer band, said inner band having an inner radius being equal to approximately one-half an outer radius of said outer band, each of said fabric panels having a pair of opposing inner and outer borders and a pair of opposing side borders extending between said inner and outer borders, said inner and outer bands and said panels defining a central opening having said apex at a center thereof and a plurality of exhaust vents having a generally trapezoidal shape arranged in alternating relation with said panels between said side borders of adjacent pairs of said panels;

(b) a plurality of suspension lines having substantially the same length and being interconnected together at said apex of said canopy and extending radially outwardly from said apex along and connected to said respective panels and downwardly from said outer band, said suspension lines being attachable to an object for supporting the object by said parachute; and (c) at least one centerline interconnected with said suspension lines at said apex of said canopy and extending downwardly therefrom, said centerline being attachable to the object for assisting in causing inflation of said canopy upon deployment of said parachute.

12. The parachute of claim 11 wherein said outer border of each panel being of greater length than said inner border thereof.

13. The parachute of claim 11 wherein said side borders are of substantially the same length.

14. The parachute of claim 11 wherein said inner and outer lateral bands respectively extend along and are connected to said inner and outer borders of said fabric panels so as to dispose said panels in circumferentially spaced relation with respect to one another upon inflation of said canopy.

15. The parachute of claim 11 wherein said each exhaust vent has a width which is approximately one-third the total width of each said panel.

16. The parachute of claim 11, wherein said inner band has an inner radius being equal to approximately one half an outer radius of said outer band.

17. The parachute of claim 11, wherein the width of the exhaust vent is approximately one third the total width of each panel.

18. An annular spinning parachute, comprising:

(a) an annular canopy generally symmetrical about an apex and including a plurality of fabric panels each having a generally trapezoidal shape defined by a pair of opposing inner and outer borders with said border being of greater length than said inner border and a pair of opposing side borders of substantially the same length, said canopy also including a pair of inner and outer lateral bands respectively extending along and connected to said inner and outer borders of said fabric panels so as to dispose said panels in circumferentially spaced relation with respect to one another upon inflation of said canopy, said inner and outer bands and said spaced panels defining a central opening having said canopy apex at the center thereof and a plurality of exhaust vents having a generally trapezoidal shape arranged in alternating relation with said panels between said side borders of adjacent pairs of said panels;

(b) a plurality of suspension lines having substantially the same length and being interconnected together at said apex of said canopy and extending radially outwardly from said apex along and connected to one of said side borders of each of said panels and downwardly therefrom for coupling to an object supported by said parachute; and (c) at least one centerline interconnected with said suspension lines at said apex of said canopy and extending downwardly therefrom for coupling to the object supported by said parachute.

19. The parachute of claim 18 wherein said each exhaust vent has a width which is approximately one-third the total width of each said panel.

20. The parachute of claim 18 wherein said inner band has an inner radius being equal to approximately one-half an outer radius of said outer band.

21. The parachute of claim 18 wherein said outer band is weighted.

22. The parachute of claim 18, wherein said inner band has an inner radius being equal to approximately one half an outer radius of said outer band.

23. The parachute of claim 18, wherein the width of the exhaust vent is approximately one third the total width of each panel.

* * * * *

UNITED STATES PATENT AND TRADEMARK OFFICE
CERTIFICATE OF CORRECTION

PATENT NO. : 5,174,527
DATED : December 29, 1992
INVENTOR(S) : Anthony D. Kasher It is certified that error appears in the above-identified patent and that said Letters Patent is hereby corrected as shown below:

On the title page,
Section [57], Abstract, line 14, INSERT --of-- between "being" and "greater".

Column 5, line 43, DELETE "ca" and INSERT therefor --can-- .

Column 6, line 50, DELETE "band" and INSERT therefor --panel--.

Column 6, line 56, DELETE "band" and INSERT therefor --panel--.

Column 7, line 41, DELETE "band" and INSERT therefor --panel--.

Signed and Sealed this

Second Day of November, 1993

BRUCE LEHMAN

*Attest:*

*Attesting Officer*     *Commissioner of Patents and Trademarks*